(12) United States Patent
Virkar et al.

(10) Patent No.: US 11,069,144 B2
(45) Date of Patent: Jul. 20, 2021

(54) SYSTEMS AND METHODS FOR AUGMENTED REALITY BODY MOVEMENT GUIDANCE AND MEASUREMENT

(71) Applicant: MirrorAR LLC, Rockville, MD (US)

(72) Inventors: Hemant Virkar, Darnestown, MD (US); Leah Kaplan, Germantown, MD (US); Stephen Furlani, Gaithersburg, MD (US); Jacob Borgman, Ipswich, MA (US)

(73) Assignee: MirrorAR LLC, Rockville, MD (US)

( * ) Notice: Subject to any disclaimer, the term of this patent is extended or adjusted under 35 U.S.C. 154(b) by 0 days.

(21) Appl. No.: 16/570,369

(22) Filed: Sep. 13, 2019

(65) Prior Publication Data

US 2020/0090408 A1 Mar. 19, 2020

Related U.S. Application Data

(60) Provisional application No. 62/731,744, filed on Sep. 14, 2018.

(51) Int. Cl.
*G06T 19/00* (2011.01)
*G06T 7/215* (2017.01)
(Continued)

(52) U.S. Cl.
CPC ........ *G06T 19/006* (2013.01); *G06K 9/00342* (2013.01); *G06N 20/20* (2019.01);
(Continued)

(58) Field of Classification Search
None
See application file for complete search history.

(56) References Cited

U.S. PATENT DOCUMENTS

| 2014/0347392 | A1 | 11/2014 | Odessky et al. |
| 2017/0368413 | A1* | 12/2017 | Shavit ................ G06K 9/00342 |
| 2020/0035122 | A1* | 1/2020 | Abbott .................... G06T 15/10 |

FOREIGN PATENT DOCUMENTS

WO 2018/148674 A1 8/2018

OTHER PUBLICATIONS

International Search Report for PCT/US2019/051197 dated Dec. 4, 2019.

* cited by examiner

*Primary Examiner* — Jennifer Mehmood
*Assistant Examiner* — Jed-Justin Imperial
(74) *Attorney, Agent, or Firm* — Arent Fox LLP

(57) ABSTRACT

The disclosure relates to a system for providing guidance for positioning a body. The system may include a video display, one or more digital cameras configured to generate a depth video stream and a visual video stream, and a computing device including, a memory, and a processor. The processor may control the one or more digital cameras to generate the depth video stream including a depth image of the body and the visual video stream including a color image of the body. The processor identifies at least a part of the body within the images using a first trained learning machine to segment the images and isolate the body. The processor may crop both the visual image and the depth image based on the identified body. The processor may estimate a position of a plurality of joints of the body by applying a second trained learning machine to the identified and isolated part of the body. The processor may generate a current pose estimate by connecting estimated positions of the plurality of joints. The processor may overlay a visual representation of the current pose estimate over the color video stream on the video display.

22 Claims, 8 Drawing Sheets

(51) Int. Cl.
*G06N 20/20* (2019.01)
*G06K 9/00* (2006.01)
*G06T 7/73* (2017.01)

(52) U.S. Cl.
CPC ................ *G06T 7/215* (2017.01); *G06T 7/74* (2017.01); *G06T 2207/30196* (2013.01)

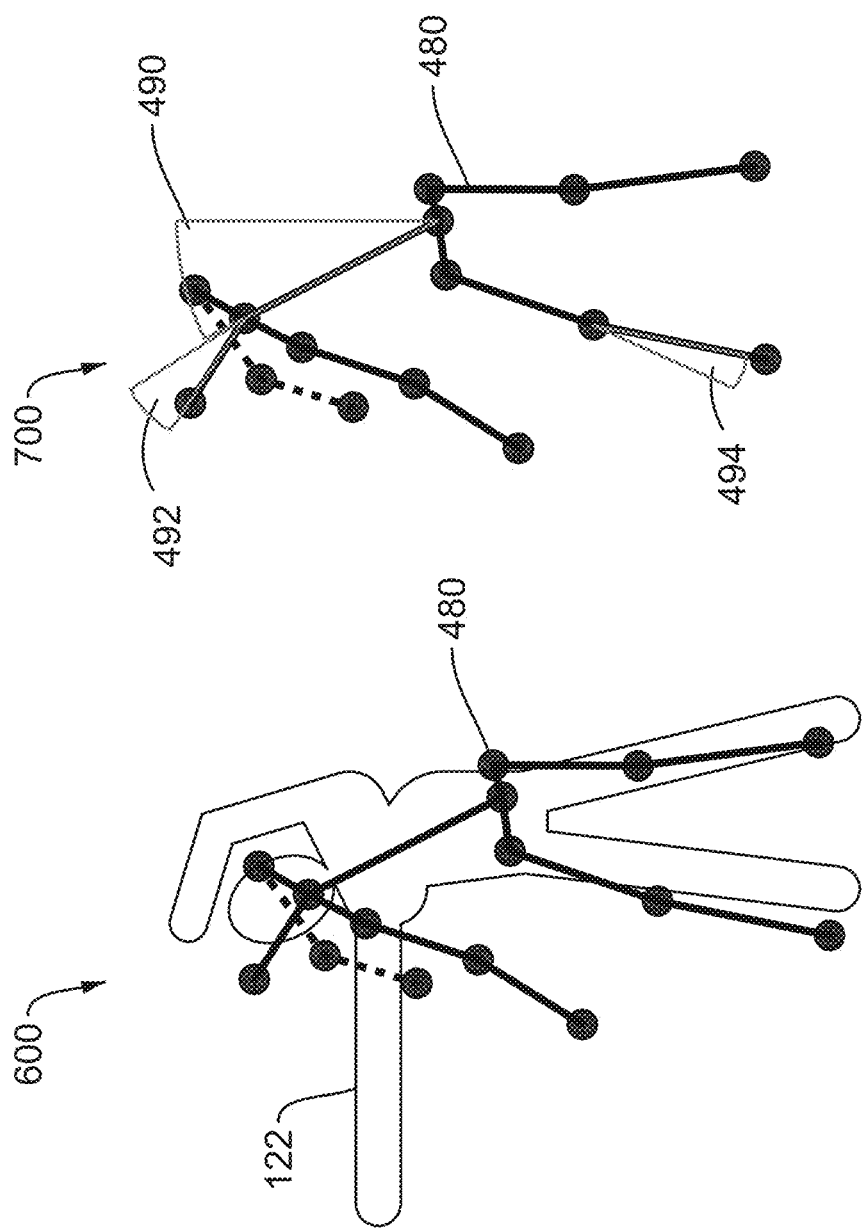
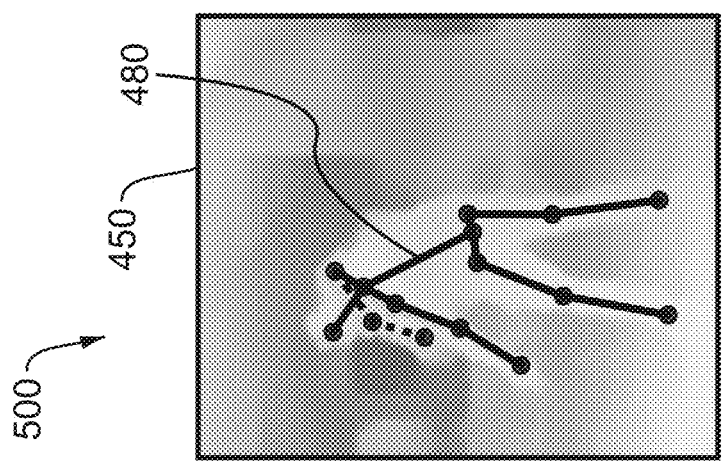
FIG. 7
FIG. 6
FIG. 5

SYSTEMS AND METHODS FOR AUGMENTED REALITY BODY MOVEMENT GUIDANCE AND MEASUREMENT

CLAIM OF PRIORITY UNDER 35 U.S.C. § 119

This application claims priority to U.S. Provisional Application No. 62/731,744 titled "SYSTEMS AND METHODS FOR AUGMENTED REALITY BODY MOVEMENT GUIDANCE AND MEASUREMENT," filed Sep. 14, 2018, which is assigned to the assignee hereof, and incorporated herein by reference in its entirety.

INTRODUCTION

The present disclosure generally relates to computer systems and methods for guiding and measuring the positioning of a body using augmented reality.

BACKGROUND

Many activities such as physical therapy, exercise, and sports involve positioning or moving the body in a particular manner. For an individual, it is often difficult to tell whether a position or movement is correct. Usually, a second person such as a therapist, doctor, trainer, or coach provides guidance to the individual. Such professional assistance, however, may be unavailable, untimely, or unaffordable in some cases.

Dedicated hardware has been used in film, video games, and professional medical assessment to capture movement. Such hardware, however, may not be available to people needing guidance. Additionally, such dedicated hardware may not be applicable to desired use cases.

In view of the above, it can be appreciated that there are problems, shortcomings or disadvantages associated with current techniques for positioning a body, and that it would be desirable if improved systems to assist individuals with positioning and measuring the body for various activities were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The disclosure relates to a system for providing guidance for positioning at least a part of a body. The system may include a video display, one or more cameras configured to generate a depth video stream and a visual video stream, and a computing device. The computing device may include a memory storing computer executable instructions and a processor configured to execute the computer executable. The processor may be configured to control the one or more cameras to generate images of the depth video stream and the visual video stream, the depth video stream including a depth image of at least the part of the body and the visual video stream including a visual image of at least the part of the body. The processor may be configured to identify at least the part of the body within the images using a first trained learning machine. The processor may be configured to estimate a position of a plurality of joints of the body by applying a second trained learning machine to the isolated and identified part of the body within the images. The processor may be configured to generate a current pose estimate of the identified part of the body by connecting estimated positions of the plurality of joints. The processor may be configured to overlay a visual representation of the current pose estimate over the color video stream on the video display.

In an aspect, the processor may be configured to overlay the visual representation of the current pose in real time as the cameras generate the images of the depth video stream and the visual video stream.

In an aspect, the processor is configured to overlay the visual representation of the current pose over a video frame within 10 frames of the images.

In an aspect, the processor is further configured to: compare the pose estimate with a target pose; and display an indication of whether the pose estimate matches the target pose. The processor may be further configured to overlay a visual representation of the target pose over the visual video stream on the video display.

In an aspect, the processor may be configured to calculate a difference between the pose estimate and the target pose. The processor may be configured to overlay a visual representation of the difference over the visual video stream on the video display. The visual representation of the difference may direct the user to the target pose. The representation of the difference may be one of an angle, direction, or distance. The processor is configured to record the difference in association with the user and the target pose.

In an aspect, the processor is configured to display a subsequent pose in response to determining that the pose estimate matches the target pose. The processor may be configured to display a sequence of pose segments and compare a current pose estimate with the target pose for each pose segment. Additionally, the processor may be configured to compare a timing component of the pose segments with a time that the current pose estimate matches each pose segment to track movement of the user.

In an aspect, the processor may be configured to record one or more objective measurements of the current pose and store the one or more measurements in association with the user. The processor may be configured to record one or more subjective metrics related to the current pose from the user and store the one or more subjective metrics in association with the user and the current pose.

In an aspect, the target pose is a position of an exercise routine and the system guides the user through the exercise routine. The processor may be configured to store a record indicating whether the user successfully completes each pose of the exercise routine.

In an aspect, the first trained learning machine may be configured to segment the visual image and identify at least the body part in the image. In an aspect, the second trained learning machine may be configured to generate a heatmap of predicted locations for each of the plurality of joints.

In an aspect, the second trained learning machine is trained to generate a three-dimensional coordinate of each of the plurality of joints, wherein the training set for the second trained learning machine includes images with labels identifying three-dimensional coordinates of each joint.

In an aspect, the processor is configured to: integrate two dimensional pixel coordinates with depth distances to define a common unit of length for three dimensions; and perform inverse kinematic calculations on three dimensional joint coordinates and biologically feasible positions to determine joint angles.

In an aspect, the processor is configured to apply two dimensional coordinates of the joints and corresponding depth distances to a third trained learning machine that maps the two dimensional coordinates of the joints and corresponding depth distances into a three dimensional model.

In another aspect, the disclosure provides a method providing guidance for positioning a body. The method may include controlling one or more cameras to generate images of a depth video stream and a visual video stream, the depth video stream including a depth image of at least the part of the body and the visual video stream including a visual image of at least the part of the body. The method may include identifying at least the part of the body within the images using a first trained learning machine. The method may include isolating the identified part of the body from the images. The method may include estimating a position of a plurality of joints of the body by applying a second trained learning machine to the isolated and identified part of the body within the images. The method may include generating a current pose estimate of the identified part of the body by connecting estimated positions of the plurality of joints. The method may include overlaying a visual representation of the current pose estimate over the visual video stream on the video display.

These and other aspects of the invention will become more fully understood upon a review of the detailed description, which follows.

BRIEF DESCRIPTION OF THE DRAWINGS

FIG. 5 is an example output display including a representation of a pose estimate and a video image, according to an aspect of the disclosure.

FIG. 6 is an example output display including a representation of a pose estimate and a target pose, according to an aspect of the disclosure.

FIG. 7 is an example output display including a representation of a pose estimate and an angle difference, according to an aspect of the disclosure.

DETAILED DESCRIPTION

Figure 1:
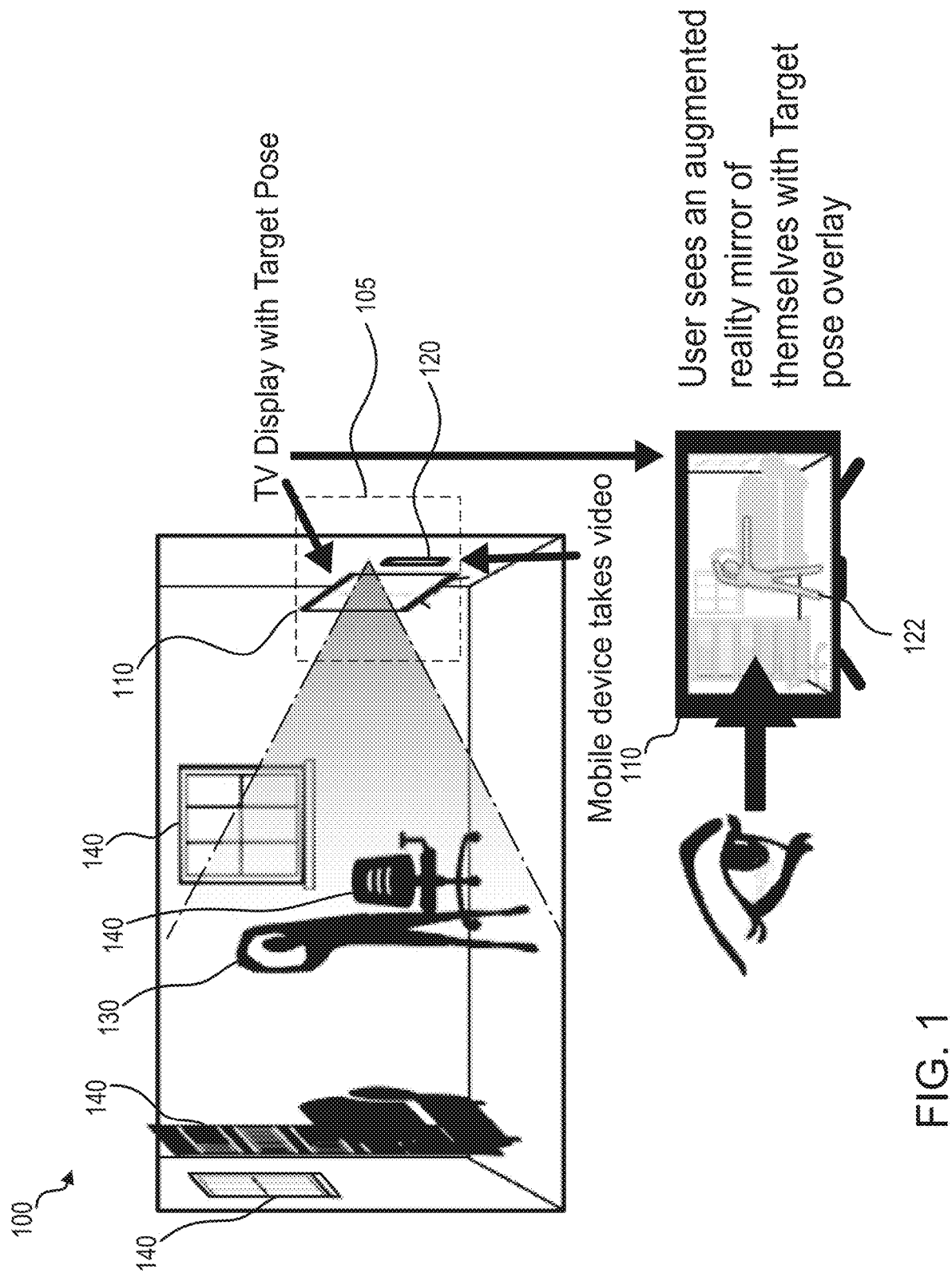
FIG. 1 is schematic diagram showing an example environment of an example augmented reality body guidance system, according to an aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

Current techniques for positioning a body and recording the position typically involve either a trained professional or dedicated hardware. Trained professionals may be expensive and/or require a person to accommodate the schedule of the trained professional. Further, even with training, a human may be limited in the amount of information that can be observed, collected, and recorded. The trained professional may insert a subjective perspective into observations, which may cloud the judgment of others who view a record. Dedicated hardware for positioning a body or recording body positions may not be available or convenient for many use cases. For example, a motion capture suit may be used in film to capture movements of an actor for realistic computer generated imagery. It may be unrealistic, however, for a physical therapy patient to don a motion capture suit for performing daily exercise. Body worn sensors may capture body movement information, but are typically limited to movement of a single body part and rely on assumptions to estimate general movement.

The present disclosure provides for an augmented reality body guidance system that provides a user with a video display for positioning the body of the user, or a part thereof. The augmented reality body guidance system may include a video display and a computing device. The computing device may include or be connected to one or more cameras. The computing device may generate a visual image of the body and a depth image of the body using the cameras. The computing device may use a first trained learning machine to identify the body of the user from a background of the images. As used herein, the term "trained learning machine" refers to a computer model based on sample data that may be executed by a computer processor to perform a task. The computing device may isolate the identified body from the rest of the images by using techniques such as cropping. The computing device may use a second trained learning machine to estimate joint positions of the identified, isolated body. In an aspect, the estimated joint positions may be in 3-dimensional (3D) space. The computing device may generate an estimated body pose and overlay the estimated body pose on an image (e.g., the visual image) for the user to view. The augmented reality body guidance system may also display a target pose and/or a difference from the target pose.

Additionally, the augmented reality body guidance system may track performance of the user with respect to the estimated body pose matching the target pose. For example, the augmented reality body guidance system may determine measurements of the body of the user and store or transmit the measurements.

The augmented reality body guidance system may be used for various scenarios that require specific positioning of the body. For example, a first use case is physical therapy or rehabilitation. The augmented reality body guidance system may provide a user with guidance through one or more rehabilitation exercises, which may be conducted at home. The augmented reality body guidance system may reduce the frequency of need to meet with a medical care provider or physical therapist. In a second use case, the augmented reality body guidance system may guide the user through a correct exercise form. The augmented reality body guidance system may be programmed with a series of poses for completing an exercise routine. Additional use cases include telemedicine (e.g., for diagnosis), medical research (e.g., gait analysis, prosthetic performance), disease progression monitoring, sports instruction, military training, interactive video games, motion capture studio, and remote shopping (e.g., virtual fitting room).

FIG. 1 is schematic diagram showing an example environment 100 of an example augmented reality body guidance system 105, according to an aspect of the disclosure. The environment 100 may include the augmented reality body guidance system 105, a user 130, and optionally one or more other objects 140. Generally, the environment 100 may be any location providing space for the user 130 to move and view a video display 110. In an aspect, the user 130 may not be required to wear any sensors and may be dressed comfortably in a convenient location such as the home of the user 130. The augmented reality body guidance system 105 may include a video display 110 and a computing device 120. In an aspect, the computing device 120 may be positioned near the video display 110 and facing substantially the same direction. Although the computing device 120 may be separated from the video display 110 and turned to face the user 130, close positioning of the computing device 120 to the video display 110 may allow the user to focus attention on the video display. In other scenarios, for example, use cases focusing on movement of specific body parts, the computing device 120 may be moved to focus on the specific body part while the user 130 views the video display 110.

The video display 110 may be a video display capable of receiving input from the computing device 120. For example, the video display 110 may be a television or computer monitor. In an aspect, the video display 110 may receive a wireless video input signal (e.g., wireless HDMI) from the computing device 120. In another aspect, a compatible wired connection may be used between the computing device 120 and video display 110. In an aspect, a video display of the computing device 120 may be used as the video display 110 or may act as a second video display presenting either a copy of the video display 110 or a user interface for controlling the video display 110. In an aspect, the video display 110 may display a target pose 122. The target pose 122 may represent a pose that the user 130 should emulate by moving his/her body.

The computing device 120 may be a computer such as a desktop computer, laptop computer, or mobile device. The computing device may include a processor, a memory, and 3-dimensional (3D) imaging capabilities. For example, the computing device 120 may include or be connected to at least one camera such as a digital color video camera (e.g., RGB) and/or depth camera. The depth camera may be, for example, an infrared camera or a stereoscopic camera. In an aspect, several mobile phones such as the iPhone X are currently available that include 3D imaging capabilities. The computing device 120 may generate a visual image and a depth image of a scene including the user 130. A visual image may include a plurality of pixels, each pixel defining a visual property (e.g., color, intensity, and, opacity). A depth image may similarly include a plurality of pixels, but each pixel may define a depth from the camera to a nearest object. A visual video stream may include a plurality of sequential visual images. A depth video stream may include a plurality of sequential depth images. The scene may also include the objects 140, which may include, for example, chairs, doors, bookshelves, decorations, windows, or other objects that may be present in the environment 100. As discussed in further detail below, the computing device 120 may utilize a first trained learning machine to isolate the body of the user 130 from a background of the image including the objects 140. Isolation of the user 130 may allow the system 105 to be used at any location. Further, the user may move within a field of view of the camera. When the user is partially obscured or out of the field of view, the system 105 may analyze those portions of the body of the user 130 that are visible.

Figure 2:
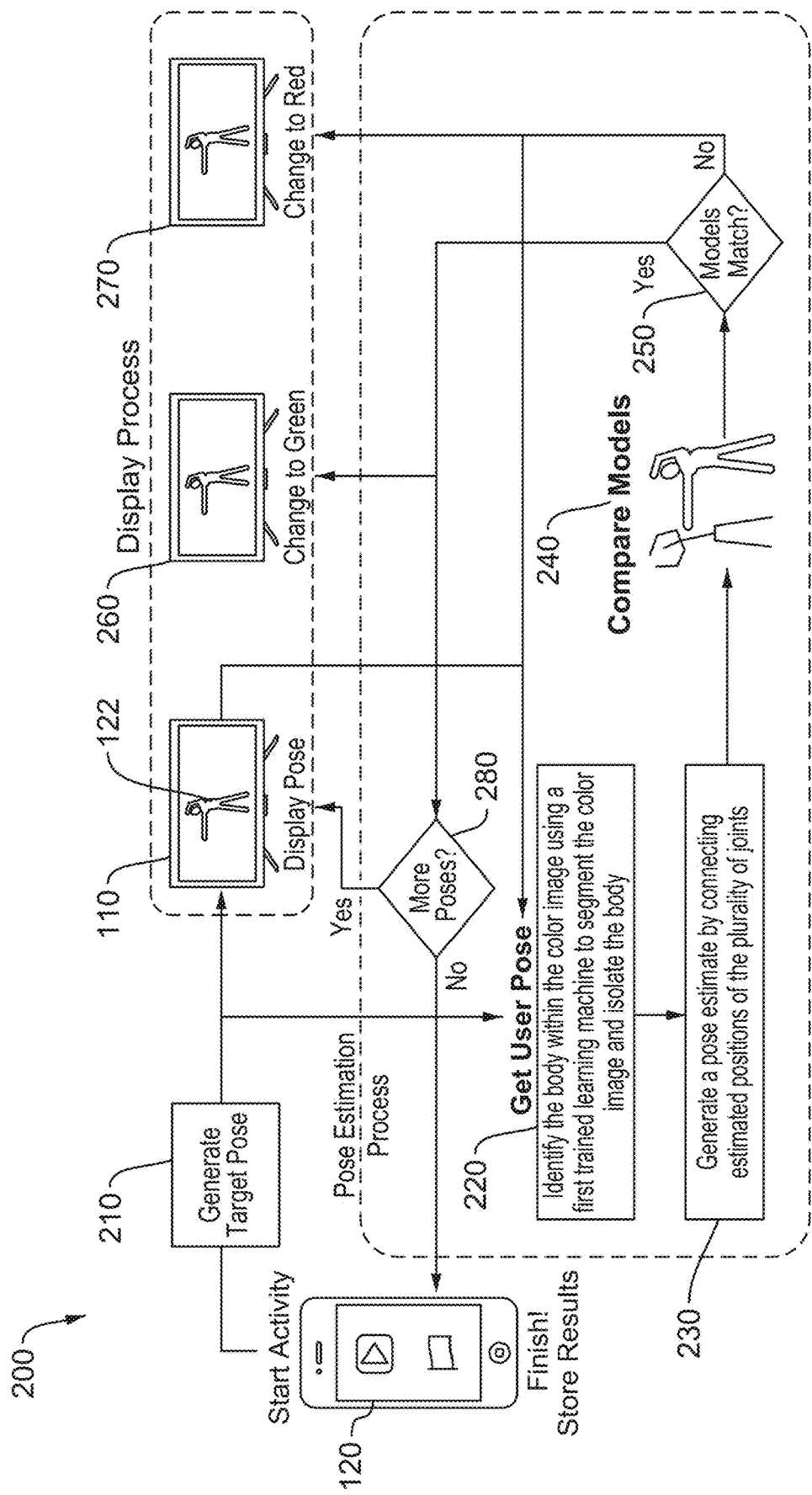
FIG. 2 is a flow diagram of an example method of guiding a body into a target pose, according to an aspect of the disclosure.

FIG. 2 is a flow diagram of an example method 200 of guiding a body into a target pose 122, according to an aspect of the disclosure. The method 200 may be performed by the augmented reality body guidance system 105. More specifically, the computing device 120 may perform a pose estimation process and control a display process performed by the video display 110. The computing device 120 may be programmed to perform the method 200 with computer-executable instructions (e.g., an application) stored in a computer-readable medium (e.g., a computer memory). The application may be modular and may be able to load modules for different use cases. For example, a module may include one or more poses or segments thereof. Accordingly, a specialist may provide modules for specific use cases, which may be customized to a user 130, within the framework of the application. For instance, modules may be loaded when the application is installed, or downloaded from external sources available to a specialist or the user 130. In the example of a physical therapy scenario, a healthcare provider may publish a library of physical therapy exercises that will be standard among multiple patients. If a doctor prescribes a subset of the exercises, the specialist or user 130 may download this library and the specialist may configure the modules to create a specific exercise routines customized to the user 130.

At block 210, the computing device 120 may generate a visual representation of a target pose 122. The target pose 122 may be stored in a memory of the computing device 120, for example, as a set of joint positions. The target pose 122 may be a model of a desired position of the body of the user 130. The computing device 120 may generate the visual representation by mapping the joint positions into a 3D space at a location of the user 130. The target pose 122 may be user-fixed or world-fixed. If the target pose 122 is world-fixed, then the user 130 may be instructed to position their body so that it meets the position and scale of the target pose 122, as shown on the video display 110. World-fixed target poses 122 may be used as the initial pose in a series so that the user is positioned in such a manner that all subsequent poses in the series may be captured by the camera. If the pose is user-fixed, then the device 120 takes the information in an image to scale and position the target pose 122 so that the target pose 122 fits the current size and position of the user 130. User-fixed target poses 122 may be used for determining the user's joint positions without requiring the user 130 to be in a specific position, so that the user 130 may focus on their pose. When the target pose 122 is user-fixed, the device 120 may delay the presentation of the target pose 122 until after the device 120 has calculated a current use pose. In an aspect, the target pose 122 may include an outline, which may visually represent a permissible deviation from the joint positions. The computing device 120 may output the visual representation of the target pose 122 to the video display 110, for example, as an overlay over a current input image from the color camera of the computing device 120.

At block 220, the computing device 120 may identify the body within the images using a first trained learning machine to segment the images and isolate the body. In an aspect, the first trained learning machine may be applied to the visual image, which may be a color image. The first trained learning machine may generate a segment including the body. The computing device 120 may isolate the identified body by techniques such as cropping both the visual image and the depth image based on the identified body.

At block 230, the computing device 120 may estimate a position of a plurality of joints of the body by applying a second trained learning machine to the isolated body in the depth and color images. For example, the second trained learning machine may output a series of estimated 3D coordinates of joints using inverse kinematics to determine the 3D coordinates from 2D pixel locations. In an implementation, the estimated 3D coordinates may be in the form of a feature vector or heatmap. A feature vector may directly give an estimate of the coordinate for the given joints. A heatmap may give a probability for each location in space that the joint may occupy. The heatmap may then choose the location with the highest probability as an estimate for the coordinate of a given joint.

The system 105 may also impose limitations on the positions of joints that relate to human anatomy. As an example, the human elbow does not typically hyperextend to over 270 degrees. Therefore, the system 105 may limit the range of acceptable positions for the shoulder, wrist, and elbow joints to accommodate this physiological limitation.

The computing device 120 may generate a pose estimate by connecting the estimated positions of the plurality of joints. The pose estimate may be a model of a current position of the body of the user or parts thereof (e.g., only a leg). The pose estimate may include 3D coordinates for the estimated position of each joint. In an aspect, the second trained learning machine may output two-dimensional (2D) coordinates of estimated position of each joint. The computing device 120 may use the depth image to determine the 3D coordinates of each joint.

In an aspect, the computing device 120 may overlay a visual representation of the current pose estimate over the visual video stream on the video display 110. For example, the estimated pose may be visually represented as lines connecting the estimated positions of the plurality of joints. Accordingly, both the estimated pose and the target pose 122 may be presented on the video display 110. The visual representation of the current pose estimate may be presented in real time as the video streams are generated by the camera. There may be a small processing delay of the first and second trained learning machines, but the delay may be kept within limits that allow the user 130 to respond to the displayed visual representation of the current pose and adjust a position of their body. A time between display of an image of the video stream and display of the current pose based on the image may be less than 0.5 second, preferably less than 0.3 second, and more preferably less than 0.1 second. The delay may be based on processing power of the computing device 120.

At block 240, the computing device 120 may compare models of the position of the body of the user. For example, the computing device 120 may compare the estimated pose with the target pose 122. In an aspect, the comparing may include determining whether the estimated pose falls within a tolerance of the target pose 122. In another aspect, the comparing may include determining a difference between the estimated pose and the target pose, such as a difference in an angle of a joint. The comparison may be performed using the Euclidian distance between each joint of the estimated pose and target pose 122. The comparison may be determined as a summed whole, or joint-by-joint. If it is joint-by-joint, then the system 105 may display specific feedback such as an arrow on each joint to better indicate to the user how to fit into the target pose.

The system 105 may also apply weights to certain joints that are more or less important to the target pose 122 when performing the comparison. For example, when performing bicep curls, the positions of the user's wrists, elbows, and shoulders are more important and may be weighted heavier than the position of their hips, knees, and ankles. In this manner, the weight applied to joints that are not relevant to the exercise may be 0, removing that particular joint from the requirements and success criteria of the target pose 122.

At block 250, the computing device 120 may determine whether the models match. For example, the computing device 120 may determine that the estimated pose falls within the tolerance of the target pose 122 or determine that the difference between the estimated pose and the target pose is less than a threshold.

In response to the models matching, at block 260, the computing device 120 may indicate a successful match. For example, the computing device 120 may change the displayed color of the target pose. For instance, the color of the target pose 122 may change from blue to green. The method 200 may also proceed to block 280 in response to the models matching.

In response to the models not matching, at block 270, the computing device 120 may indicate that the models do not match. For example, the computing device 120 may change the displayed color of the target pose. For instance, the color of the target pose 122 may change from blue to red. In an aspect, the method 200 may return to block 220 in response to the models not matching. That is, the computing device 120 may repeatedly estimate the current pose of the user and compare the current pose to the target pose 122 until the current pose matches the target pose 122. A timer or other limit may be used to escape the loop when no match occurs.

At block 280, the computing device 120 may determine whether at least one more target pose 122 is available. For example, a physical therapy system may include a series of poses for the user 130 to attempt. If an additional pose is available, the method 200 may return to block 210, where the additional target pose 122 is generated and displayed. If no additional pose is available, the method 200 may store results related to the poses.

Figure 3:
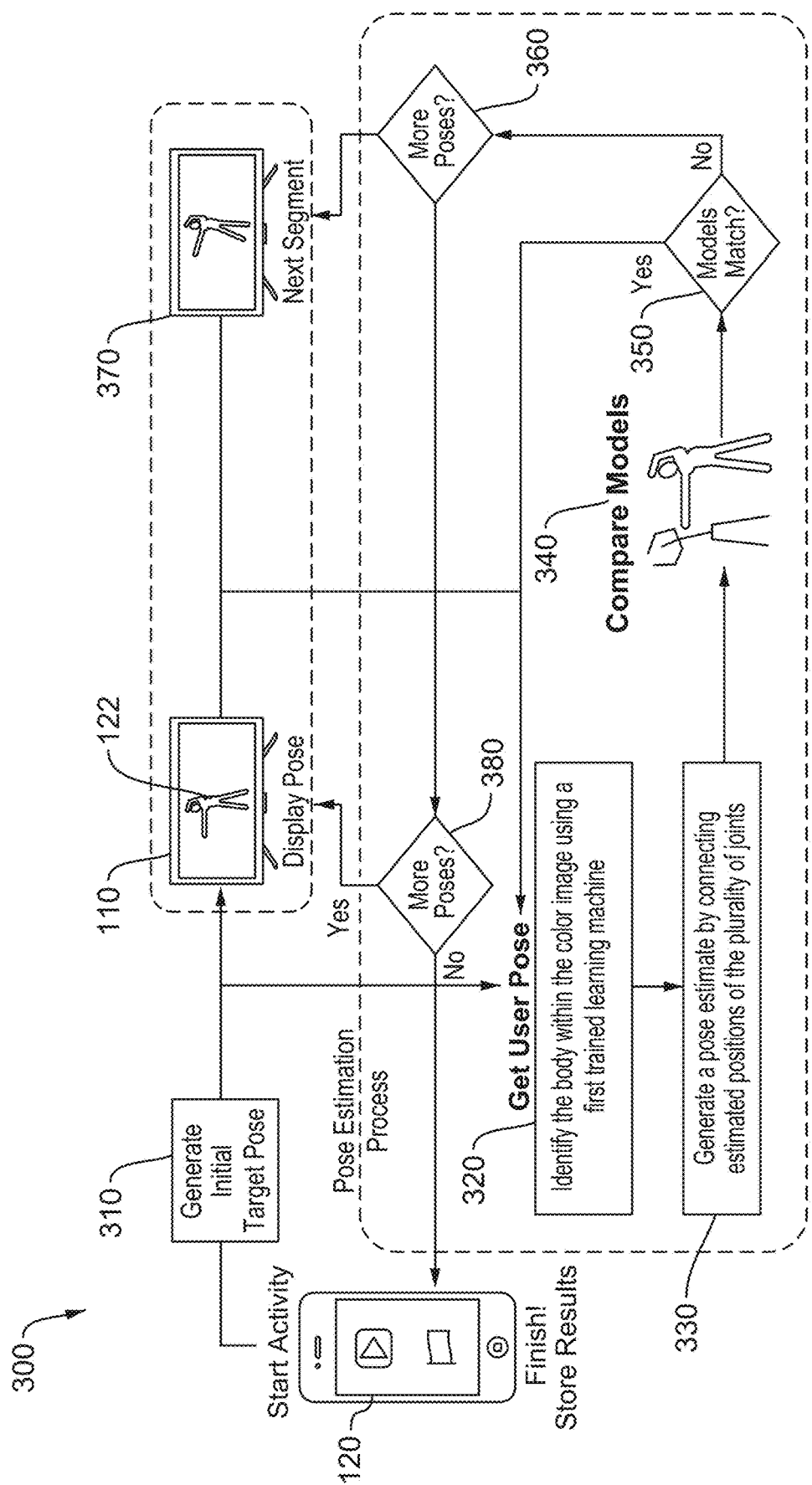
FIG. 3 is a flow diagram of an example method of guiding a body through a series of poses, according to an aspect of the disclosure.

FIG. 3 is a flow diagram of an example method 300 of guiding a body through a series of poses, according to an aspect of the disclosure. The method 300 may be similar to the method 200 in some aspects, but may be adapted to poses including a series of segments. The series of segments may represent movement of the body from an initial pose. The method 300 may be performed by the augmented reality body guidance system 105. More specifically, the computing device 120 may perform a pose estimation process and control a display process performed by the video display 110.

Poses may be tracked or untracked. A segment is a set of joint positions that also include a time component. An untracked pose contains a single set of joint positions which is the final position the user 130 should be in for that target pose. When a user 130 executes an untracked pose, the user 130 may take any time and any method to reach the target position. In this manner, when a user 130 executes an untracked pose they may stop, stretch, walk out of the scene, etc. as long as the user 130 eventually makes the target pose 122. A good example of untracked poses would be casual Yoga, where the user 130 is given freedom to form each pose in the manner that is most comfortable to them.

A tracked pose contains a series of sets of joint positions, each set being called a segment, which typically include timing requirements. In an aspect, in order to successfully fit the pose, the user must fit all the given segments in starting the pose, optionally fitting them in given time frames. Tolerances may be used to allow various amounts of deviation. For example, in some cases, a limited number of segments may be missed, or a pose may be missed by a certain degree of difference. In this manner, when a user executes a tracked pose the user 130 should remain focused and in position. If the user 130 deviates too much from any of the target poses 122 within the set, the user 130 may be asked to start over. A tracked pose may be used for an exercise such as squats, for example. In order to execute a good squat, the user should be in proper form when they stand, when they descend, when they squat, and when they ascend. The system 105 may compare the current pose to the target pose 122 for each of the positions, as well as measure the time between the poses.

At block 310, the computing device 120 may generate a visual representation of an initial target pose associated with a series of segments. The target pose and a segment including a series of poses may be stored in a memory of the computing device 120, for example, as a sequence of sets of joint positions, or a sequence of changes from an initial set of joint positions, and timing components associated with one or more of the poses and segments. Each pose in a segment may be considered a target pose 122 and may be a model of a desired position of the body of the user 130. The computing device 120 may generate the visual representation by mapping the joint positions into a 3D space at a location of the user 130. In an aspect, the target pose 122 may include an outline, which may visually represent a permissible deviation from the joint positions. The computing device 120 may output the visual representation of the target pose 122 to the video display 110, for example, as an overlay over a current input image from the color camera of the computing device 120.

At block 320, the computing device 120 may identify the body or a part thereof within the visual image using a first trained learning machine in a similar manner to block 220. For example, the first trained learning machine may be configured to segment the visual image and isolate the body. The first trained learning machine may generate a segment of the image including the body. The computing device 120 may isolate the body or part thereof from a background of the image. For example, the computing device 120 may crop both the visual image and the depth image based on the segment of the image including the identified body parts.

At block 330, the computing device 120 may estimate a position of a plurality of joints of the body by applying a second trained learning machine in a similar manner as block 230. For example, the second trained learning machine may be applied to the isolated body of part thereof. The second trained learning machine may output a series of estimated 2D or 3D coordinates of joints. The computing device 120 may determine 3D coordinates based on the depth image. Similar to the method 200, the computing device 120 may generate a pose estimate by connecting the estimated positions of the plurality of joints. The pose estimate may be a model of a current position of the body of the user. In an aspect, the computing device 120 may overlay a visual representation of the current pose estimate over the color video stream on the video display 110. For example, the estimated pose may be visually represented as lines connecting the estimated positions of the plurality of joints. Accordingly, both the estimated pose and the target pose 122 may be presented on the video display 110.

At block 340, the computing device 120 may compare models of the position of the body of the user. For example, the computing device 120 may compare the estimated pose with the target pose 122. In an aspect, the comparing may include determining whether the estimated pose falls within a tolerance of the target pose 122. In another aspect, the comparing may include determining a difference between the estimated pose and the target pose, such as a difference in an angle of a joint. When the target pose 122 is associated with a timing component, the computing device 120 may also determine whether the timing of the current pose matches the timing component of the target pose 122. Once again, a tolerance may be used to determine whether the user 130 has satisfied the timing component.

At block 350, the computing device 120 may determine whether the models match. For example, the computing device 120 may determine that the estimated pose falls within the tolerance of the target pose 122 or determine that the difference between the estimated pose and the target pose is less than a threshold. A match may also include the time of the current pose satisfying the timing component of the target pose 122.

In response to the models matching, at block 360, the computing device 120 may determine whether the series of target segments includes additional segments. If the series of target segments includes at least one additional segment, at block 370, the computing device 120 may display the next segment on the video display 110. If there are no additional segments in the series of target segments, at block 380, the computing device 120 may determine whether at least one more target pose 122 is available. If an additional pose is available, the method 300 may return to block 310, where the additional target pose 122 is generated and displayed. If no additional pose is available, the method 300 may include storing results related to the poses.

The results may include a record of whether the user 130 met each target pose 122. Additionally, the results may include measurements of deviations from target poses 122 (e.g., an angle from the correct position), or measurements of individual joints when attempting particular target poses 122 (e.g., an angle of a joint, or angle from horizontal or vertical). The measurements may be objective measurements from the perspective of the system 105. For example, a minimum or maximum angle of a joint during an exercise may be measured and recorded. In some scenarios, the measurements may include a number of repetitions of an exercise or target pose 122.

The results may be stored individually or in aggregate, such that the user's performance may be reported to a specialist (such as physical therapist or personal trainer) for further evaluation. The user may also review their own performance, so that they can track their own fitness and health themselves. For example, performance tracking may be used for the physical therapy use case, as the system 105 can store performance measurements and report on whether the user 130 conformed to the prescribed physical therapy. For example, the system 105 may indicate how often the user performed the exercises, and how well the user performed the exercises.

In addition, the system 105 may record self-reported data, from the user 130, which may include subjective measurements such as pain, fatigue, energy, sleep, state of mind, etc. that may be useful for the specialist or individual reviewing their performance. The system 105 may collect such data via the video display 110 and/or mobile device 120. For instance, the video display 110 and/or mobile device 120 may include a microphone, keypad, or touch interface. In an aspect, the video display 110 and/or mobile device 120 may execute software to provide a conversational artificial intelligence based voice assistant. For example, the voice assistant may ask questions before, during, or after the user 130 is attempting a pose. For example, the voice assistant may ask whether the user 130 is experiencing pain during the movement. The voice assistant may also provide instructions or feedback in addition to the visually indicated feedback. For example, the instruct the user 130 to move a particular body part in a direction based on a determined difference from the target pose. The video display 110 and/or mobile device 120 may also provide audio or haptic feedback. In an aspect, additional monitoring devices such as heart rate monitors may be connected to the system to record additional measurements.

In an aspect, the system 105 may also give direct feedback to the user 130 about their performance other than accuracy. The mobile device may review the stored data and give feedback such as "your performance this week is higher than last week" or other such common-language terms. In an aspect, the system 105 may not give medical advice or diagnostic information. Instead, the system 105 may provide information to a specialist who has prescribed or recommended the use of the system 105 for physical therapy.

Figure 4A:
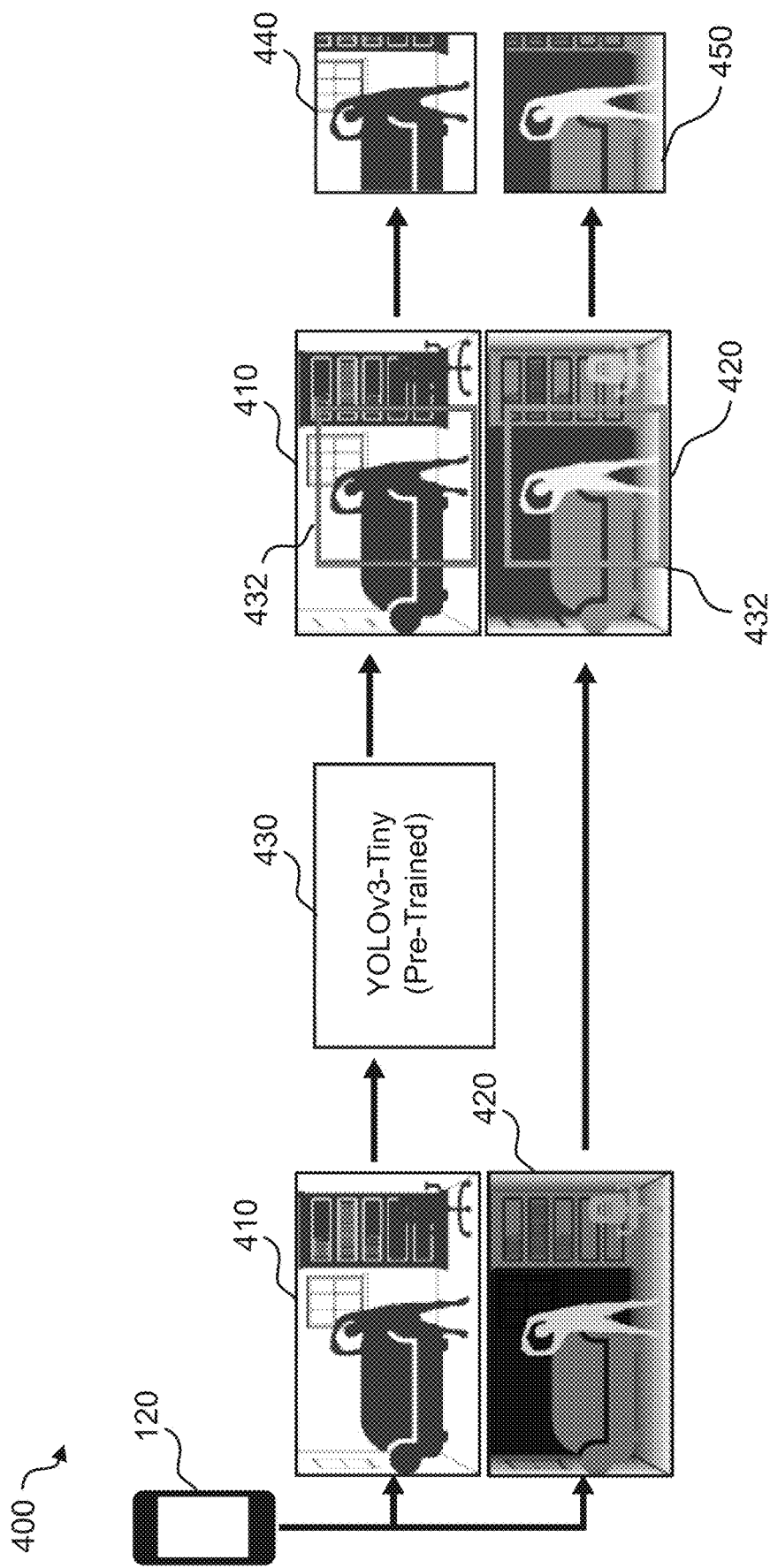
FIGS. 4A and 4B are schematic diagrams of an example method of determining body pose based on video inputs, according to an aspect of the disclosure.
Figure 4B:
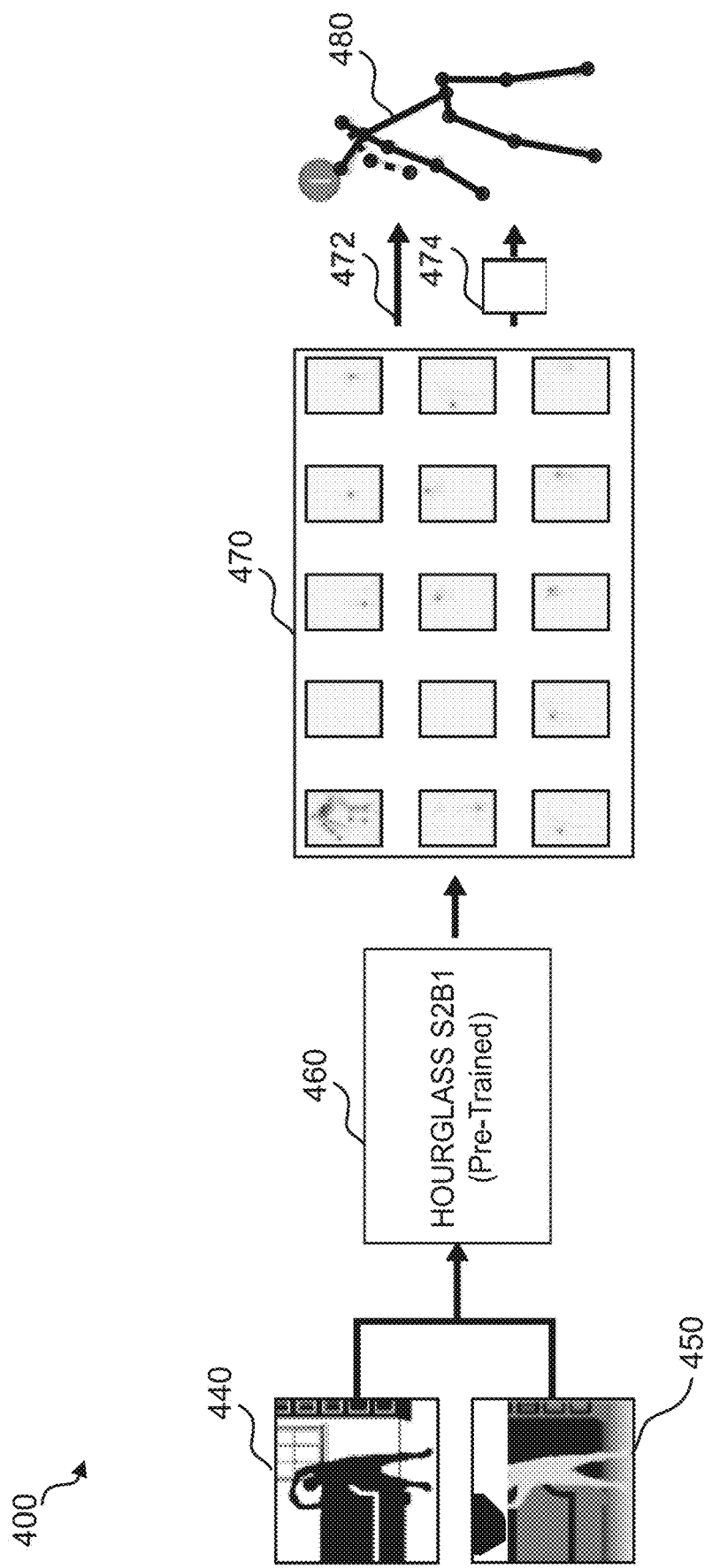

FIGS. 4A and 4B are schematic diagrams of an example method 400 of determining body pose based on video inputs, according to an aspect of the disclosure. More specifically, FIG. 4A provides an example of blocks 220 and 320 and FIG. 4B provides an example of blocks 230 and 330. The method 400 may be performed by the computing device 120. The computing device 120 may generate a color image 410 and a depth image 420 of the environment 100 including the user 130. The color image 410 may include a set of pixels. Each pixel may have one or more color values. For example, the color may be represented as red, green, and blue (RGB) color values. The color image 410 may be an example of a visual image. It should be appreciated that other visual images such as greyscale images may be used in a similar manner. The depth image 420 may be an image of the same environment 100 as the color image 410. The depth image 420 may also include a set of pixels, which may correspond to the pixels of the color image 410. Each pixel of the depth image 420 may be associated with a depth value representing a distance from the camera to a closest object. For example, as illustrated, lighter shaded portions of the depth image 420 are closer to the camera than darker shaded portions. In an aspect, the color image 410 and depth image 420 may be combined into a single set of pixels with both color (or greyscale) values and depth values. Additionally, it should be appreciated that depth values may use either a positive or negative scale (e.g., reverse-z) to indicate a distance from the camera.

A first trained learning machine 430 may receive the color image 410 and produce an image segment 432 including the body of the user 130. The first trained learning machine 430 may be an object detection learning machine. In an example implementation, the first trained learning machine 430 may be a you-only-look-once (YOLO) real-time object detection system. A real-time object detection system may segment the image quickly enough (e.g., approximately 30 ms) such that the segmentation may be used to update the pose estimate at a display frame rate (e.g., 30 frames per second). The first trained learning machine 430 may be, for example, a neural network that is applied to the color image 410. For example, a YOLOv3 system may be a 106 layer fully convolutional neural network. The neural network may be trained to identify images of a human body. In an aspect, the first trained learning machine 430 may be trained specifically on images of the user 130. The first trained learning machine 430 may output an image segment 432 including the detected human body as a location and size of the image segment 432.

The computing device 120 may crop both the color image 410 and the depth image 420 using the image segment 432 to generate a cropped color image 440 and a cropped depth image 450, respectively.

A second trained learning machine 460 may receive the cropped color image 440 and the cropped depth image 450 as input. The second trained learning machine may estimate the locations of joints in the body of the user 130. In an example, the second trained learning machine 460 may be a deep convolutional network referred to as a stacked hourglass neural network or hourglass model. The second trained learning machine 460 may pre-trained on an extensive corpus of labeled data (e.g., photographs of bodies with body parts and joints labeled). The second trained learning machine 460 may perform a multi-classification on each pixel in a video frame to determine to which human joint the pixel belongs. For example, the multi-classification may determine a probability for each of 17 human joints and select the most likely joint. The second trained learning machine 460 may generate joint predictions 470 (e.g., heatmaps) that each locate a specific joint. The computing device 120 may generate the pose estimate 480 by connecting the locations given by the joint predictions 470. In an aspect, the pose estimate 480 generated by the second trained learning machine 460 may include two dimensional locations for each joint.

The computing device 120 may generate a three dimensional model of the body including a set of joint angles using the depth image 420 and/or cropped depth image 450. The pose estimate 480 may be overlaid on the depth image 420 and/or cropped depth image 450. A Z-coordinate corresponding to each joint may be estimated based on the depth value of the corresponding pixel of the depth image 420 and/or cropped depth image 450. For example, in an operation 472, the computing device 120 may integrate pixel coordinates (x,y) and depth (z) distances and redefine these three quantities in a common unit of length. The computing device 120 may then perform inverse kinematic calculations on the resulting set of 3D coordinates to determine biologically feasible positions in order to obtain the set of joint angles. The 3D model may be generated using the pose estimate 480, depth values, set of joint angles, and measurements (e.g., arm length) or assumptions (e.g., equal arm lengths) about the body of the user 130. In another aspect, the computer device 120 may employ a third trained learning machine 174 to generate the three dimensional model of the body. The third trained learning machine 174 may directly map the 2D joint data (e.g., x, y coordinates) and depth distances to the set of joint angles. For instance, the third trained learning machine 174 may be trained on 3D models generated using the inverse kinematic calculations, which may be manually reviewed. The third trained learning machine 174 may be relatively light weight and may be less computationally intensive than an explicit streaming calculation of the joint angles using algebraic and/or iterative inverse kinematics. Accordingly, use of a third trained learning machine 174 may allow a higher frame rate for the 3D model.

FIG. 5 is an example output display 500 including a representation of a pose estimate 480 and a video image, according to an aspect of the disclosure. The video image illustrated may be the cropped depth image 450, but the pose estimate 480 may be displayed overlaying other images such as the color image 410, depth image 420, or cropped color image 440. As illustrated, the pose estimate 480 may include circular points showing the location of joints and connecting lines representing the torso and limbs. In some embodiments, the lines may be expanded to diamond shapes indicating a width of a limb. In an aspect, parts of the pose estimate 480 may be obscured by other parts of the body and the corresponding estimates may be less reliable. The pose estimate 480 may provide an indication of reliability using color, line weight, or line patterns. For example, as illustrated, the partially obscured right arm of the pose estimate 480 is shown with dashed lines.

FIG. 6 is an example output display 600 including a representation of a pose estimate 480 and a target pose 122, according to an aspect of the disclosure. Both the pose estimate 480 and the target pose 122 may be displayed overlaying a corresponding image (e.g., color image 410, not shown).

FIG. 7 is an example output display 700 including a representation of a pose estimate 480 and an angle difference 490, according to an aspect of the disclosure. The computing device 120 may determine the angle difference 490 by comparing the pose estimate 480 and the target pose 122. More specifically, an angle between lines drawn between a pair of corresponding points in each of the pose estimate 480 and target pose 122 may be determined. A visual representation of the angle difference 490 may be superimposed on the pose estimate 480. In an aspect, an angle difference 490 may be determined for multiple joints or limbs. The computing device 120 may display the greatest angle difference 490, a number of greatest differences by rank, or any angle difference that is greater than a threshold. A user 130 may use the angle difference 490 to adjust a current position toward the target pose 122, for example, by straightening the back as illustrated. Other corrections may include raising the head as illustrated by angle difference 492 and straightening the forward leg as illustrated by angle difference 494, which may also be superimposed on the pose estimate 480.

Figure 8:
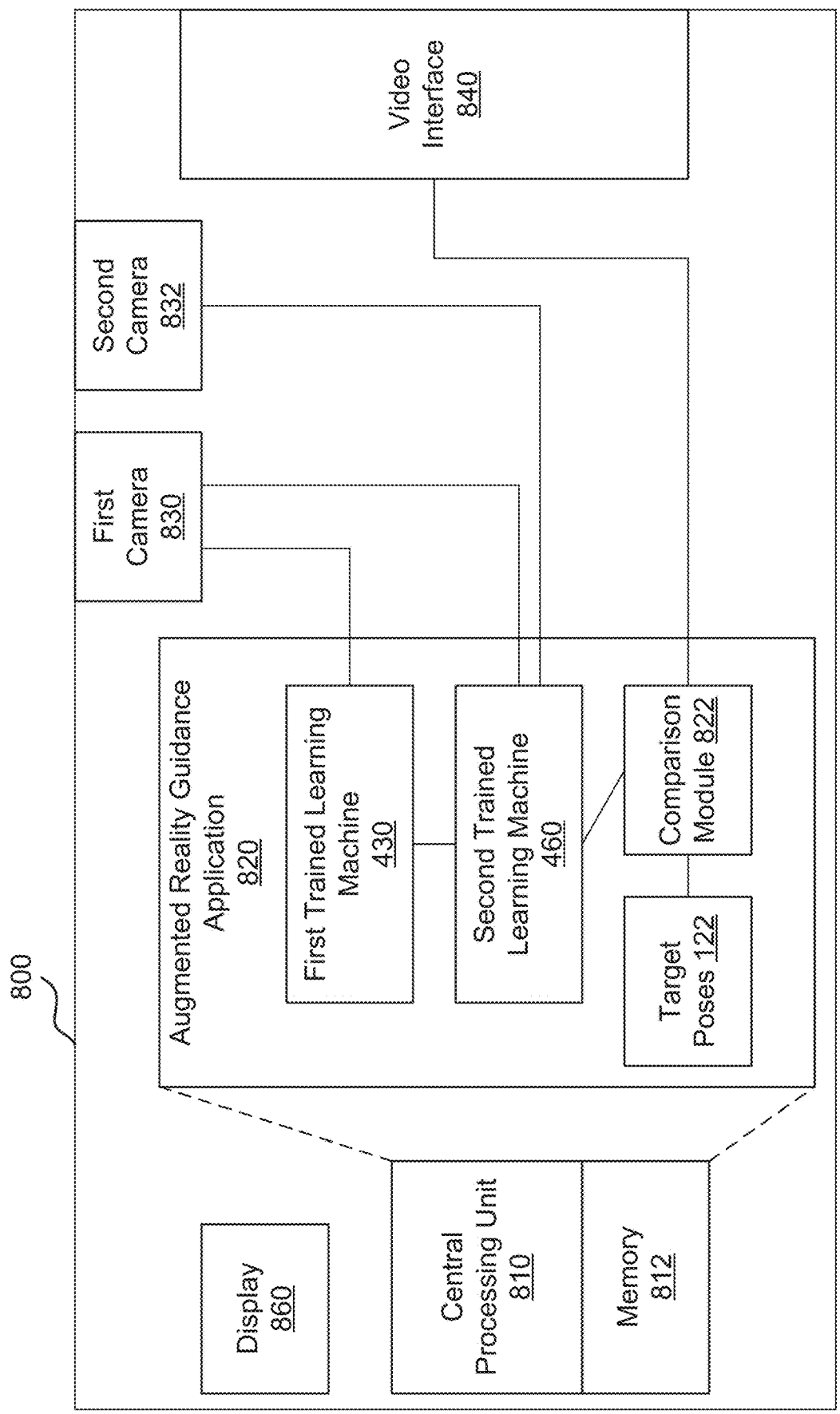
FIG. 8 illustrates a block diagram of a mobile device for providing an augmented reality body guidance system according to an exemplary aspect

FIG. 8 illustrates a block diagram of a mobile device 800 for providing an augmented reality body guidance system according to an exemplary aspect. Mobile device 800 is an example of the computer device 120 and generally represents the computing device 120 described above. In general, mobile device 800 can be any type of mobile device, for example, and will include an operating system and a central processing unit ("CPU") 810 provided to, among other things, execute augmented reality guidance application 820. In this aspect, the augmented reality guidance application 820 can be downloaded from a server (e.g., an application store) and installed and includes software code (e.g., processor executable instructions) in memory (e.g., memory 812), which may be configured to execute/facilitate the augmented reality body guidance system 105 on the mobile device 800 according to the exemplary aspects described herein. The mobile device 800 further includes a first camera 830, a second camera 832, and a video interface 840. As noted above, the first camera 830 may be a digital color camera that provides the color image 410 to the first trained learning machine 430 and the second trained learning machine 460. The second camera 832 may be provide a depth image 420 to the second trained learning machine 460. As discussed above, the second camera 832 may be an infrared camera, or the second camera 832 may be a second color camera, and the depth image may be determined based on distance from the first camera 830 and image differences. The video interface 840 may send a video signal including a video image (e.g., color image 410) and optionally pose estimate 480, target pose 122, or angle difference 490 to the video display 110.

According to an exemplary aspect, the augmented reality guidance application 820 downloaded on mobile device 800 is configured to execute a plurality of module, including first trained learning machine 430, second trained learning machine 460, and comparison module 822. The augmented reality guidance application 820 may also include target poses 122. These modules may be part of augmented reality guidance application 820 in one exemplary aspect or separate software component(s) according to another exemplary aspect. As used herein, the term "module" refers to a software service or application executed on one or more computers, including computing device 120, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein. For purposes of this disclosure above with respect to the exemplary algorithms, the disclosure generally refers to the computing device 120 and/or a processor (e.g., CPU 810) and/or one of the specific modules as shown to perform the various steps of the algorithm.

As is the case for all mobile devices, mobile device 800 is generally configured to execute and/or provide a plurality of software applications for the user of the mobile device 800. For example, as described above, the augmented reality guidance application 820 can be provided by a server, as a remote application server that remotely provides software applications on mobile device 800.

Figure 9:
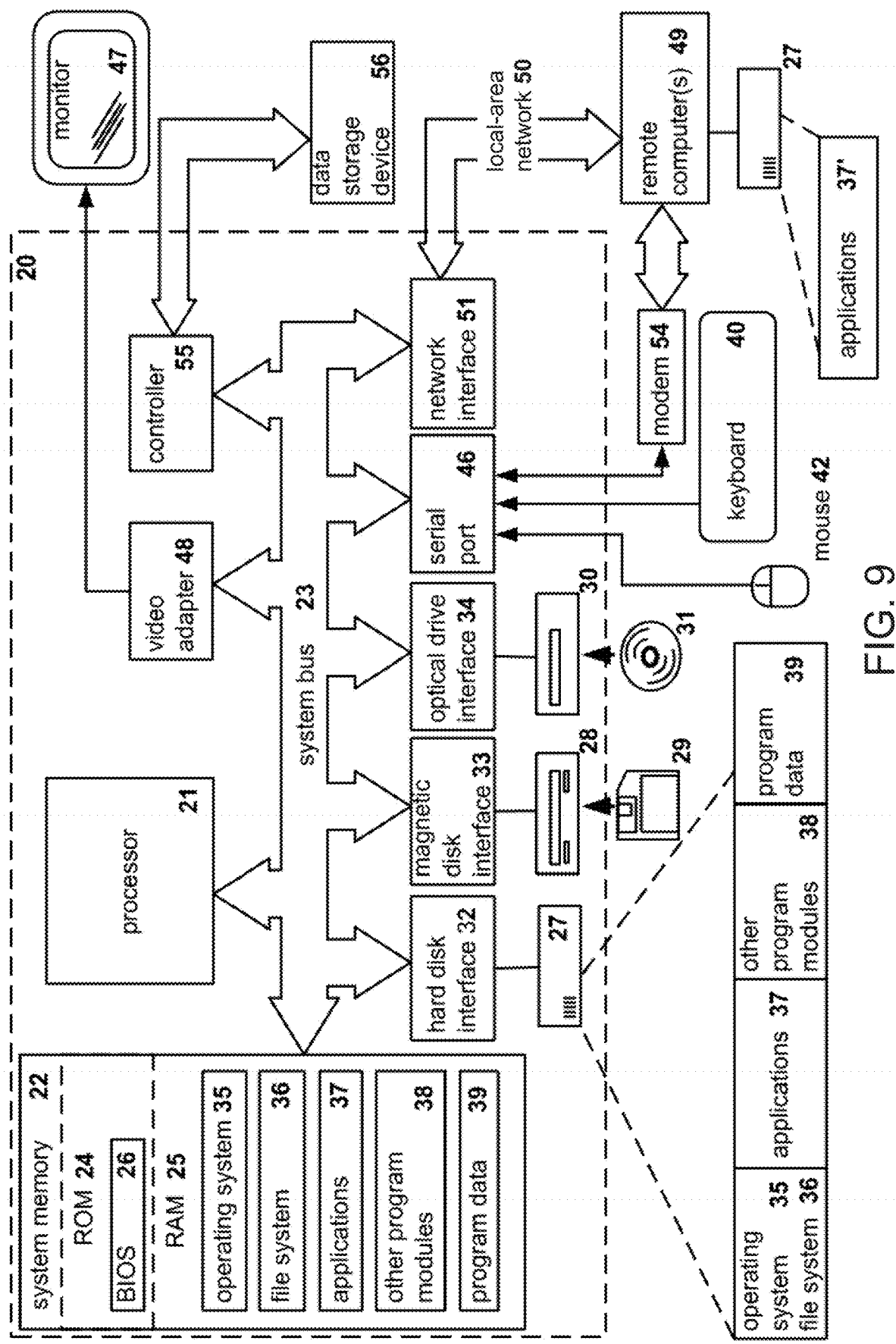
FIG. 9 illustrates a block diagram of an example of a general-purpose computer system on which the disclosed system and method can be implemented according to an example aspect

FIG. 9 illustrates a block diagram of an example of a general-purpose computer system on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to computing device 120 described above, processing unit 21 can correspond to the CPU 810, and system memory 22 can correspond to memory 812 according to various exemplary aspects.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include the hard disk drive 27 for reading from and writing to a hard disk, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 (which can correspond to display 860) and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server (e.g., servers 24A to 24N), a router, a network PC, a peer device, physical equipment and/or other common network node, and typically includes many or all of the elements described above relative to the computer 20. The logical connections include a network interface or adapter 53 and connected to a local area network (i.e., LAN) 50, for example, and/or a wide area network (not shown). Such networking environments are commonplace in offices, enterprise-wide computer networks, Intranets and the Internet.

When used in a LAN networking environment, the computer 20 is connected to the local area network 50 through a network interface 51 or adapter 53. When used in a WAN networking environment, the computer 20 typically includes a modem 54 or other means for establishing communications over the wide area network, such as the Internet. Moreover, the modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in software, in which the methods may be stored as one or more instructions or code on a non-volatile computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

The invention claimed is:

1. A system for providing guidance for positioning at least a part of a body of a user, comprising:
   a video display configured to display a visual video stream of a visual representation of visual images of the body of the user;
   one or more cameras configured to generate the visual video stream; and
   a computing device comprising:
      a memory storing computer executable instructions; and
      a processor configured to execute the computer executable instructions to:
         control the one or more cameras to generate images of the visual video stream;
         obtain a depth video stream that includes a depth value of at least the part of the body;
         identify at least the part of the body within the images using a first trained learning machine;
         isolate the identified part of the body from the images by cropping the visual representation of the visual images of the body of the user;
         estimate two-dimensional coordinate positions in the visual video stream of each of a plurality of joints of the body by applying a second trained learning machine to the isolated and identified part of the body within the cropped visual images;
         estimate three-dimensional coordinate positions of each of the plurality of joints of the body by applying the depth value to the estimated two-dimensional coordinate positions in the visual stream;
         model a current pose of the identified part of the body by connecting the estimated three-dimensional coordinate positions of each of the plurality of joints;
         display, on the video display and overlaid on the visual video stream, a visual representation in real time of the modeled current pose of the identified part of the body that is visually represented by a plurality of lines that connect the estimated three-dimensional coordinate positions of each of the plurality of joints;

overlay, on the video display and concurrently with both the visual video stream and the visual representation of the modeled current pose, a target pose associated with a sequence of target pose segments, such that the visual representation of the plurality of lines for the modeled current pose of the body is displayed relative to the target pose; and display, on the video display, the sequence of target pose segments and track the modeled current pose with the sequence of target pose segments to determine whether the user executes the sequence of target pose segments within a given time frame and within a tolerance threshold between modeled current pose and each target pose of the sequence of target pose segments.

2. The system of claim 1, wherein the processor is configured to overlay the visual representation of the modeled current pose in real time as the cameras generate the images of the depth video stream and the visual video stream.

3. The system of claim 1, wherein the processor is configured to overlay the visual representation of the modeled current pose over a video frame within 10 frames of the images.

4. The system of claim 1, wherein the processor is further configured to
display an indication of whether the modeled current pose matches the target pose.

5. The system of claim 4, wherein the processor is configured to display a subsequent pose in response to determining that the modeled current pose matches the target pose.

6. The system of claim 4, wherein the target pose is a position of an exercise routine and the system guides the user through the exercise routine.

7. The system of claim 6, wherein the processor is configured to store a record indicating whether the user successfully completes each pose of the exercise routine.

8. The system of claim 1, wherein the processor is configured to calculate a difference between the modeled current pose and the target pose.

9. The system of claim 8, wherein the processor is configured to overlay a visual representation of the difference over the visual video stream on the video display.

10. The system of claim 9, wherein the visual representation of the difference directs the user to the target pose.

11. The system of claim 9, wherein the representation of the difference is one of an angle, direction, or distance.

12. The system of claim 8, wherein the processor is configured to record the difference in association with the user and the target pose.

13. The system of claim 1, wherein the processor is configured to compare a timing component of the pose segments with a time that the modeled current pose matches each pose segment to track movement of the user to determine whether the user executes the sequence of target pose segments within the given time frame.

14. The system of claim 1, wherein the processor is configured to record one or more objective measurements of the current pose and store the one or more measurements in association with the user.

15. The system of claim 1, wherein the processor is configured to record one or more subjective metrics related to the modeled current pose from the user and store the one or more subjective metrics in association with the user and the modeled current pose.

16. The system of claim 1, wherein the first trained learning machine is configured to segment the visual image and identify at least the body part in the image.

17. The system of claim 1, wherein the second trained learning machine is configured to generate a heatmap of predicted locations for each of the plurality of joints.

18. The system of claim 1, wherein the second trained learning machine is trained to generate three-dimensional coordinate positions of each of the plurality of joints, wherein the training set for the second trained learning machine includes images with labels identifying three-dimensional coordinates of each joint.

19. The system of claim 1, wherein the processor is configured to:
integrate two dimensional pixel coordinates with depth distances to define a common unit of length for three dimensions; and
perform inverse kinematic calculations on three dimensional joint coordinates and biologically feasible positions to determine joint angles.

20. A method providing guidance for positioning at least a part of a body of a user, comprising:
controlling one or more cameras to generate images of a visual video stream that includes a visual representation of visual images, of at least the part of the body;
obtaining a depth video stream that includes a depth value of at least the part of the body;
identifying at least the part of the body within the images using a first trained learning machine;
isolating the identified part of the body from the images by cropping the visual representation of the visual images of the body of the user;
estimating two-dimensional coordinate positions in the visual video stream of each of a plurality of joints of the body by applying a second trained learning machine to the isolated and identified part of the body within the cropped visual images;
modeling a current pose of the identified part of the body by connecting the estimated three-dimensional coordinate positions of each of the plurality of joints;
displaying, on a video display, the visual stream of the visual representation of the part of the body;
displaying, on the video display and overlaid on the visual stream, a visual representation in real time of the modeled current pose of the identified part of the body that is visually represented by a plurality of lines that connect the estimated three-dimensional coordinate positions of each of the plurality of joints; and
overlaying, on the video display and concurrently with both the visual video stream and the visual representation of the modeled current pose, a target pose associated with a sequence of target pose segments, such that the visual representation of the plurality of lines for the modeled current pose of the body is displayed relative to the target pose; and
displaying, on the video display, the sequence of target pose segments and track the modeled current pose with the sequence of target pose segments to determine whether the user executes the sequence of target pose segments within a given time frame and within a tolerance threshold between modeled current pose and each target pose of the sequence of target pose segments.

21. The method of claim 20, further comprising:
calculating a difference between the modeled current pose and the target pose; and overlaying a visual representation of the difference over the visual video stream on the video display.

22. The method of claim 20, further comprising comparing a timing component of the pose segments with a time that the modeled current pose matches each pose segment to track movement of the user to determine whether the user executes the sequence of target pose segments within the given time frame.

* * * * *